United States Patent
Roveri et al.

(10) Patent No.: US 11,178,874 B2
(45) Date of Patent: Nov. 23, 2021

(54) ARTICLES COMPRISING ANTIOXIDIZING AGENTS AND BACTERIOSTATIC AGENTS, AND PRODUCTION PROCESSES THEREOF

(71) Applicant: BENVIC SAS, Chevigny-Saint-Sauveur (FR)

(72) Inventors: Norberto Roveri, Bologna (IT); Marco Lelli, Monghidoro (IT); Massimo Masetti, Calderara di Reno (IT); Sandra Petraroia, San Lazzaro di Savena (IT)

(73) Assignee: BENVIC SAS, Chevigny-Saint-Sauveur (FR)

( * ) Notice: Subject to any disclaimer, the term of this patent is extended or adjusted under 35 U.S.C. 154(b) by 461 days.

(21) Appl. No.: 16/088,140

(22) PCT Filed: Mar. 30, 2017

(86) PCT No.: PCT/IB2017/051816
§ 371 (c)(1),
(2) Date: Sep. 25, 2018

(87) PCT Pub. No.: WO2017/168357
PCT Pub. Date: Oct. 5, 2017

(65) Prior Publication Data
US 2020/0385544 A1      Dec. 10, 2020

(30) Foreign Application Priority Data

Mar. 31, 2016   (IT) .................... 102016000033262

(51) Int. Cl.
*A01N 59/02*      (2006.01)
*C09D 7/61*       (2018.01)
(Continued)

(52) U.S. Cl.
CPC .............. *A01N 59/02* (2013.01); *C01B 25/32* (2013.01); *C08J 7/043* (2020.01); *C08K 3/22* (2013.01);
(Continued)

(58) Field of Classification Search
None
See application file for complete search history.

(56) References Cited

U.S. PATENT DOCUMENTS 1,639,601 A * 8/1927 Gardiner .................. B27K 3/28
                                                52/741.3
5,360,145 A * 11/1994 Gueret ................ B05B 11/0005
                                                222/190
(Continued)

FOREIGN PATENT DOCUMENTS

| CN | 1386422 A | 12/2002 |
|----|-----------|---------|
| CN | 103232774 A | 8/2013 |

(Continued)

OTHER PUBLICATIONS

Spectraveil OP TDS (Year: 2021).*
Tioveil OP TDS (Year: 2021).*
International Search Report and Written Opinion dated Jul. 5, 2017, in corresponding PCT Application No. PCT/IB2017/051816, 11 pages.
XP002764607, Database Summary, Thomson Scientific, 1 page.
XP002764608, Database Summary, Thomson Scientific, 1 page.
XP002764609, Database Summary, Thomson Scientific, 2 pages.
XP002764610, Database Summary, Thomson Scientific, 2 pages.
(Continued)

*Primary Examiner* — Peter A Salamon
(74) *Attorney, Agent, or Firm* — Oliff PLC

(57) ABSTRACT

An article may include a material having a surface containing at least one zinc oxide and/or salt, and at least one antioxidant. A method of using a mixture including at least one zinc oxide and/or salt, and at least one antioxidant, as bacteriostatic agent may include: applying the mixture to a surface of an article.

16 Claims, 1 Drawing Sheet

(51) Int. Cl.
  *C01B 25/32* (2006.01)
  *C08K 3/22* (2006.01)
  *C08K 5/00* (2006.01)
  *C09D 5/14* (2006.01)
  *C08J 7/043* (2020.01)

(52) U.S. Cl.
  CPC ............ *C08K 5/005* (2013.01); *C08K 5/0058* (2013.01); *C09D 5/14* (2013.01); *C09D 7/61* (2018.01); *C08K 2003/2296* (2013.01)

(56) References Cited

U.S. PATENT DOCUMENTS

| | | | | |
|---|---|---|---|---|
| 6,120,758 | A * | 9/2000 | Siddiqui | A61K 8/34 424/401 |
| 2007/0003502 | A1* | 1/2007 | Tanabe | A61Q 7/00 424/70.13 |
| 2007/0140984 | A1* | 6/2007 | Kusano | A61K 8/676 424/49 |
| 2014/0296442 | A1* | 10/2014 | Fiori | C08F 12/08 525/313 |
| 2015/0204015 | A1* | 7/2015 | Gomi | B29C 35/0277 162/261 |
| 2020/0385544 | A1* | 12/2020 | Roveri | D06M 11/76 |

FOREIGN PATENT DOCUMENTS

| | | |
|---|---|---|
| CN | 104673042 A | 6/2015 |
| JP | 2000239968 A | 9/2000 |
| WO | 2014155156 A1 | 10/2014 |

OTHER PUBLICATIONS

Ahamed et al., "Synthesis, Characterization, and Antimicrobial Activity of Copper Oxide Nanoparticles," Journal of Nanomaterials, vol. 2014, article ID 637858, Feb. 9, 2014, 4 pages.
Carmona-Ribeiro et al., "Cationic Antimicrobial Polymers and Their Assemblies," International Journal of Molecular Sciences, 2013, 14, pp. 9906-9946.
Chan et al., "Antioxidant and antibacterial properties of green, black, and herbal teas of Camellia sinensis," Pharmacognosy Research, Oct. 2011, vol. 3, issue 4, pp. 266-272.
Chen et al., "Antioxidant and Antibacterial Activities of Eugenol and Caravacrol-Grafted Chitosan Nanoparticles," Biotechnology and Bioengineering, vol. 104, No. 1, Sep. 1, 2009, pp. 30-39.
Das et al., "Synthesis and evaluation of antioxidant and antibacterial behavior of CuO nanoparticles," Colloids and Surfaces B: Biointerfaces 101 (2013), pp. 430-433.
Li et al., "Two-Level Antibacterial Coating with Both Release-Killing and Contact-Killing Capabilities," Langmuir 22 (2006), pp. 9820-9823.
Morris et al., "Antimicrobial Finishing of Cotton with Zinc Pyrithione," Textile Research Journal, Dec. 1, 1983, pp. 725-728.
Pospisil, "Mechanistic Action of Phenolic Antioxidants in Polymers—A Review," Polymer Degradation and Stability, 20 (1988), pp. 181-202.
Watts et al., "Carbon nanotubes as polymer antioxidants," Journal of Materials Chemistry, 2003, 13, pp. 491-495.
Xie et al., "Antibacterial Activity and Mechanism of Action of Zinc Oxide Nanoparticles against Campylobacter jejuni," Applied and Environmental Microbiology, vol. 77, No. 7, Apr. 2011, pp. 2325-2331.

* cited by examiner

ARTICLES COMPRISING ANTIOXIDIZING AGENTS AND BACTERIOSTATIC AGENTS, AND PRODUCTION PROCESSES THEREOF

CROSS-REFERENCE TO RELATED APPLICATION(S)

This application is a national stage entry from International Application No. PCT/IB2017/051816, filed on Mar. 30, 2017, in the Receiving Office ("RO/IB") of the International Bureau of the World Intellectual Property Organization ("WIPO"), published as International Publication No. WO 2017/168357 A1 on Oct. 5, 2017, and claims priority under 35 U.S.C. § 119 from Italian Patent Application No. 102016000033262, filed on Mar. 31, 2016, in the Italian Patent and Trademark Office ("IPTO"), the entire contents of all of which are incorporated herein by reference.

The present invention relates to an article comprising an antioxidizing agent and a bacteriostatic agent. The invention also relates to a process for the production of said article.

As is known, as regards the proliferation and spreading of bacteria, an essential aspect is represented by the growth phase. In most microorganisms, growth continues until the cell splits into two new cells, a process called binary scission. With the term growth rate it is meant the variation in the number of cells or mass per time unit. The time interval during which two cells are formed starting from a single individual is called generation.

The generation time is therefore the time necessary for a cell to duplicate. Numerous bacteria have generation times ranging from 1 to 3 hours, but some microorganisms are also known that grow very rapidly, dividing themselves in about ten minutes, and others that have generation times of several hours or even days.

This mode of population growth, in which the number of cells is doubled in a certain time interval, is called exponential growth. A growth curve can be divided into various distinct stages, called latency stage, exponential stage, stationary stage and death stage. In particular, the latency stage represents the period of time which elapses from the moment in which a bacterial population is inoculated in a fresh medium, and the moment in which the growth phase begins. The latency period can be longer or shorter depending on the conditions. If a culture in the exponential stage is inoculated in the same medium while maintaining all cultivation conditions, there is no latency stage and the exponential growth continues at the same rate. If, on the contrary, the inoculum is removed from a culture in the stationary stage and inoculated in the same medium, a latency stage is normally observed even if all the cells of the inoculum are vital.

As far as the exponential stage is concerned, this is characterized by a rapid bacterial duplication which proceeds in geometric progression. In a closed system, the exponential growth cannot continue indefinitely, since there are mechanisms that limit the growth of the population in question. The end of the exponential stage is generally determined either by the exhaustion of an essential nutrient of the growth medium or by the accumulation, up to inhibitory levels, of waste products excreted from the organism. The population has therefore reached the stationary stage. During the stationary stage there is neither an increase nor a net decrease in the number of cells. If the incubation continues after the population has reached the stationary stage, the cells can survive and continue their metabolism or they can die. When the cells begin to die, they are said to have entered the death stage. During the death stage, the total count (count of both living and dead cells carried out by means of a microscope) can remain constant, but the viable count (count of living cells) slowly decreases.

Further to what mentioned before, it can be added that bacteria find growth conditions on all kinds of surfaces, and at times it is a problem to limit or halt their growth.

Various methods are currently known for conferring bacteriostatic properties to a material, which envisage treatment with compounds having bacteriostatic properties. Among these, mention can be made in particular of compounds based on sliver (as indicated in *"Two-Level Antibacterial Coating with Both Release—Killing and Contact-Killing Capabilities"—Zhi Li et al—Langmuir*—2006) *and ammonium salts ("Cationic Antimicrobial Polymers and Their Assemblies" Ana Maria Carmona-Ribeiro et al—International J. of Molecular Science* —2013). Analogously, in *"Antibacterial Activity and Mechanism of Action of Zinc Oxide Nanoparticles against Campylobacter jejuni"—Yanping Xie et al.—Applied and Enviromental Microbiology*— 2011 treatments based on nanoparticles of zinc or zinc oxide are described. Furthermore, the document *"Antimicrobial Finishing of Cotton with Zinc Pyrithione"—Cletus E. Morris et al.—Textile Research J.*—3 1983 describes the bacteriostatic activity relating to zinc pyrithione salt.

Oxidative processes that materials undergo due to the action of atmospheric oxygen, in many cases favour bacterial growth, and are sometimes solely responsible for bacterial proliferation.

It is known that phenolic organic components or inorganic components (for example, carbon nanotubes or fullerenes) have antioxidizing properties if inserted in a polymeric matrix.

*"Mechanistic action of phenolic antioxidants in polymers-A review" Polymer degradation and stability, j. Pospisil,* 1988 explains how the antioxidizing effect in a polymeric matrix is due to complex organic molecules of phenolic origin.

*"Carbon nanotubes as polymer antioxidants" Polymer degradation and stability, Watt S. et al,* 2003 explains how the use of carbon nanotubes in polymeric matrixes increases their antioxidizing effectiveness.

Some active principles of natural origin are also known in literature (such as for example eugenol—*"Antioxidant and antibacterial activities of eugenol and carvacrol-grafted chitosan nanoparticles" "Antioxidant and antibacterial properties of green, black, and herbal teas of Camellia sinensis"*) and of synthetic origin (such as, for example, nanoparticles of CuO—copper oxide—*"Synthesis and evaluation of antioxidant and antibacterial behavior of CuO nanoparticles"*) that have at the same time antibacterial and antioxidizing properties.

Patent application WO 2014/155156 describes polymeric materials having antibacterial properties, wherein the antibacterial effect is obtained by the addition of a zinc salt during the polymerization process of the monomers. This process, therefore, involves the insertion of an antibacterial agent during the synthesis of the polymers, making the process complex to carry out and non-flexible, as the modification of the polymer must be effected in the production plant, which necessarily operates on a large scale. Conversely, a post-treatment process of the already produced polymer allows the material to be adapted to specific applicative requirements without having to intervene on the polymeric synthesis processes.

The Applicant has faced the problem of obtaining articles having improved bacteriostatic properties with respect to those obtainable using known bacteriostatic compounds, in particular with respect to the degree of the bacteriostatic effect and its durability, in order to avoid to repeat the treatment with excessive frequency.

The Applicant has found that this technical problem can be solved by using a combination of a zinc compound and an antioxidizing agent, which are applied on the surface of the article already formed or, in some cases, that can be englobed in the material which is then used for the production of the article itself.

In general, antioxidizing agents primarily exert an action that slows down oxidative processes which are responsible for the degradation of materials, in particular those having an organic and macromolecular matrix, said degradation being responsible for bacterial growth. Oxidative processes, in fact, that materials undergo due to the action of atmospheric oxygen, in many cases favour bacterial growth, and are sometimes solely responsible for bacterial proliferation.

A first aspect of the present invention therefore relates to an article comprising a material, in particular a macromolecular, metallic or mineral material, having a surface containing at least one zinc oxide and/or salt and at least one antioxidizing agent.

The article advantageously offers an improvement in terms of bacteriostatic properties thanks to the combination of a zinc-based compound and an antioxidizing agent. This result is advantageously obtained without using common biocidal substances, such as nanoparticles (for example, silver nanoparticles), quaternary ammonium salts, and other substances that can have toxic or harmful effects. The above antioxidizing and bacteriostatic effect can be advantageously obtained either by treating the article already produced, or by englobing the zinc oxide and/or salt and the antioxidizing agent in the material forming the article before said material is used for producing the article itself. Although in both cases the antioxidizing and bacteriostatic effects are long-lasting, in the second case the antioxidizing and bacteriostatic agents are present not only on the external surface of the article, but also within the material forming it, consequently the antioxidizing and bacteriostatic effects remain unaltered even when significant abrasion, lamination and wear of the material occur.

The present invention is described for illustrative but non-limiting purposes according to its preferred embodiments, but it should be understood that variations and/or modifications may be applied without departing from the protection scope, as defined by the enclosed claims.

BRIEF DESCRIPTION OF THE FIGURES

The present invention is described hereunder for illustrative but non-limiting purposes according to its preferred embodiments, with particular reference to the enclosed figures, wherein.

Figure 1A:
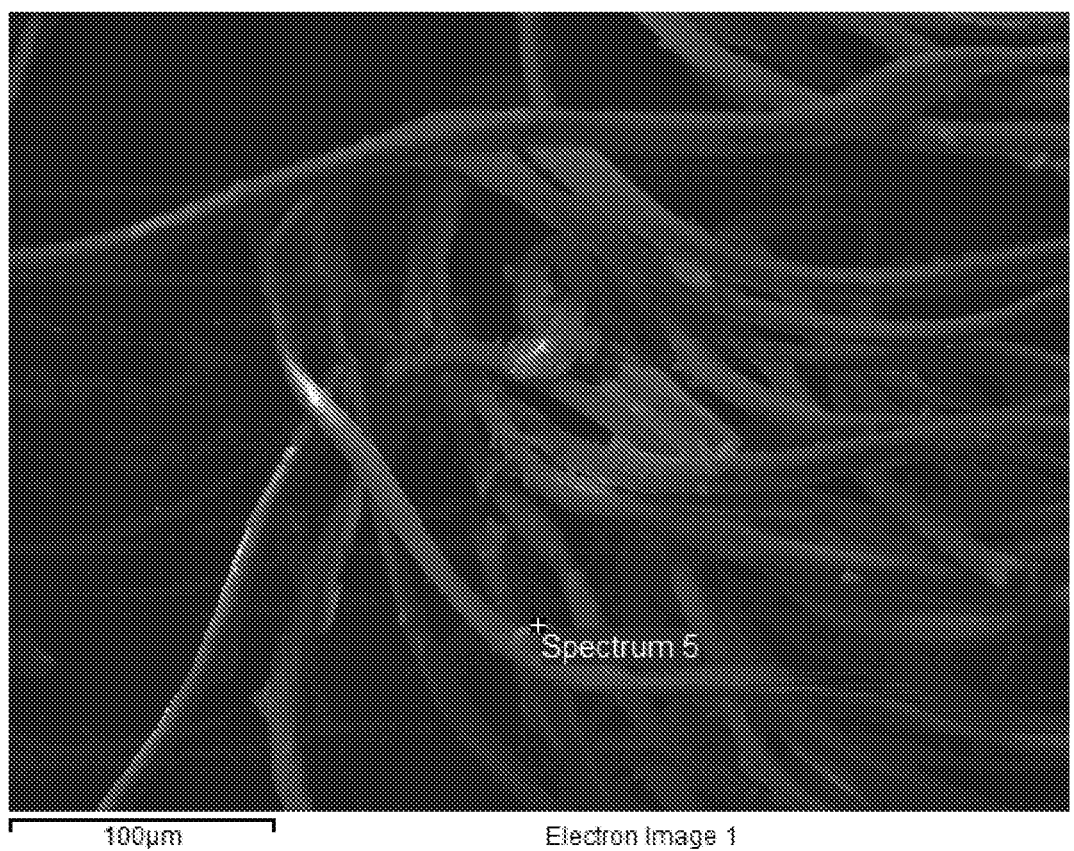
FIGS. 1A and 1B respectively show the SEM (scanning electron microscope) image and the image of EDX elemental analysis carried out on a synthetic fabric treated according to the present invention.

Further characteristics and advantages of the present invention will appear evident from the following detailed description.

According to a preferred aspect of the present invention, said at least one zinc oxide and/or salt is selected from: zinc oxide, zinc hydroxide, zinc acetate, zinc-PCA (pyrrolidine carboxylic acid zinc salt), zinc chloride, zinc carbonate, zinc sulfate, zinc phosphate and zinc-EDTA, zinc gluconate, or mixtures thereof.

According to another preferred aspect, the quantity of said at least one zinc oxide and/or salt ranges from 0.00001% to 10.0%, preferably from 0.0001% to 7.0%, wherein said percentages are weight percentages with respect to the total weight of the material.

According to a further preferred aspect, the quantity of said at least one antioxidizing agent ranges from 0.00001% to 10.0%, preferably from 0.0001% to 7.0%, wherein said percentages are weight percentages with respect to the total weight of the material.

According to a preferred aspect of the invention, the at least one antioxidizing agent is selected from selenium oxides and/or salts, preferably selenium oxide, selenium phloroglucinol, selenium chloride, selenium gluconate.

According to another preferred aspect, the at least one antioxidizing agent is selected from flavonoids (or bioflavonoids), preferably from anthocyans (or anthocyanins).

According to a further preferred aspect, the at least one antioxidizing agent is selected from citric acid salts, preferably sodium citrate, calcium citrate, potassium citrate and magnesium citrate.

According to another preferred aspect, the at least one antioxidizing agent is a β-glucan.

As indicated above, the article according to the present invention comprises a material that can be macromolecular, metallic or mineral.

As far as macromolecular materials are concerned, these can be natural, artificial or synthetic.

The macromolecular material is preferably synthetic and may be selected from: thermoplastic polymers, elastomeric polymers, thermoplastic elastomeric polymers, thermosetting (crosslinked) polymers. Alternatively, the macromolecular material is of natural origin, such as, for example, cellulose, wood, paper, cardboard, hemp, vegetable fibers.

If the material is metallic or mineral, the zinc oxide and/or salt and the antioxidizing agent are preferably applied to the surface of the article already formed. Metallic materials that can be used are, for example, aluminium, steel, stainless steel, and the like. Mineral materials that can be used are marble, granite, stone, terracotta, ceramic, glass.

According to another preferred aspect of the present invention, the material also comprises an adhesion promoter. In particular, the Applicant has found that various kinds of inorganic or organic fillers are particularly effective as adhesion promoters as they allow a better adhesion and permanence of the bacteriostatic and antioxidizing agents on the article of interest.

The adhesion promoter is preferably inorganic and is selected from: hydroxyapatite, brushite, calcium phosphate, tricalciumphosphate, amorphous silica, zeolites, clays, montmorillonite or mixtures thereof. The adhesion promoter is preferably hydroxyapatite. The adhesion promoter is preferably organic and is selected from: shellac, fish-glue, chitins, proteins, lipid protein derivatives, albumin.

According to a preferred aspect, the adhesion promoter is used when the combination of bacteriostatic agent and antioxidizing agent is applied on the surface of the article already formed, preferably in spray applications.

Said adhesion promoter is preferably applied in a quantity ranging from 0.2% to 10%, preferably from 0.5% to 5%, wherein said percentages are expressed by weight with respect to the total weight of the material.

According to a preferred aspect of the invention, the article is a textile material composed of natural or synthetic fibers, for example, cotton, linen, wool, silk, rayon, polyesters, polyamides, nylon or the like.

According to another preferred aspect, the article is a worktop or surface used for example in healthcare-hospital environments, in food processing or in industrial processing in general.

A second aspect of the present invention relates to the use of a mixture comprising at least one zinc oxide and/or salt and at least one antioxidant as bacteriostatic agent.

A third aspect of the present invention relates to a process for the production of an article comprising a macromolecular material as defined above, comprising the following steps:
- subjecting the macromolecular material to thermal or chemical treatment to soften the macromolecular material;
- dispersing at least one zinc oxide and/or salt and at least one antioxidizing agent on the softened macromolecular material;
- using the so treated macromolecular material for producing the article.

In this case, the macromolecular material is in the form of granules or pellets, and is preferably selected from thermoplastic polymers such as, for example, polyethylene (PE), polypropylene (PP), polystyrene, polyurethane, polyester, polyamide, polycarbonate, polyvinylchloride (PVC), polyethyleneterephthalate (PET), styrene copolymers (for example acrylonitrile-butadiene-styrene copolymers, ABS) and the like. The softening process of the macromolecular material can be carried out by means of thermal treatment, preferably at a temperature ranging from 30° C. to 260° C., more preferably from 40° C. to 240° C. The duration of said treatment may range from 20 minutes to 80 minutes, preferably from 30 minutes to 50 minutes.

Alternatively, the softening of the macromolecular material can be effected by means of chemical treatment, for example by using an organic solvent (such as acetone, ethyl alcohol, isopropyl alcohol, THF, dichloromethane or mixtures thereof), which is added to the macromolecular material at a temperature generally ranging from 15° C. to 50° C., preferably from 20° C. to 40° C., and is left in contact with the material until a surface softening of the same is obtained.

A fourth aspect of the present invention relates to a process for producing an article comprising a material according to the present invention, comprising the following steps:
- dispersing at least one zinc oxide and/or salt and at least one antioxidizing agent in a resin;
- treating the article with said resin containing said at least one zinc oxide and/or salt and at least one antioxidizing agent to obtain a coating film.

The treatment step of the article may be carried out for example by means of spraying, coating, film forming or dipping.

According to a preferred aspect, said at least one zinc oxide and/or salt and at least one antioxidizing agent can be dispersed in the molten resin or dissolved in a solvent. In the latter case, for example, the resin can be dissolved, according to its physico-chemical characteristics, in:
- an aqueous solution containing a base, for example sodium hydroxide, potassium hydroxide or ammonia;
- an organic solvent, preferably hydrosoluble and possibly in a mixture with water, for example an alcohol, such as isopropyl alcohol.

The resin, having a film forming function, can be selected, for example, from: polyvinylpyrrolidone (PVP), polyethyleneglycol (PEG), polyvinylacetate, polyvinyl alcohol and cellulose acetate, collagen of animal origin, pectin, polyvinyl alcohol, cellulose acetate, or mixtures thereof. Natural resins, for example rosin copal, amber, putty, sandarac, turpentine or mixtures thereof, can also be used.

The article according to the present invention can be of different types and can be used in various fields wherein a reduction or elimination of bacterial proliferation is required and wherein oxidative processes must be controlled to avoid contaminations or infections. By way of example, the following can be indicated: fabrics, non-woven fabrics, worktops or equipment, used in particular in the food or healthcare field.

The present invention is further illustrated by means of some working examples as described hereunder.

EXAMPLE 1

The counting of microorganisms was carried out on a growth plate, after the incubation period (as regards the type of microorganisms, they are microorganisms usually present in the environment). The obtained result, considered as a control, was 597 cfu (colony forming units). Then, the bacteriostatic effect was evaluated of:
- a solution of selenium phloroglucinol (20 ppm of selenium, i.e. corresponding to 0.002% by weight);
- three solutions of zinc PCA, with a concentration of zinc of 10 ppm, 20 ppm and 30 ppm respectively (i.e. respectively corresponding to 0.001%, 0.002% and 0.003% by weight).

The results obtained are indicated in Table 1.

TABLE 1

| Treatment | cfu/plate | Reduction % observed |
|---|---|---|
| control | 597 | — |
| Selenium 20 ppm | 506 | 15.9 |
| Zinc 10 ppm | 571 | 5.1 |
| Zinc 20 ppm | 550 | 6.0 |
| Zinc 30 ppm | 491 | 17.1 |

In order to evaluate the synergic effect between zinc and antioxidizing agent, the tests indicated above were repeated, using three solutions separately, respectively containing: selenium 20 ppm+zinc 10 ppm; selenium 20 ppm+zinc 20 ppm; selenium 20 ppm+zinc 30 ppm. The results are reported in Table 2.

TABLE 2

| Treatment | cfu/plate | Reduction % observed |
|---|---|---|
| Selenium 20 ppm + Zinc 10 ppm | 468 | 22.2 |
| Selenium 20 ppm + Zinc 20 ppm | 433 | 27.2 |
| Selenium 20 ppm + Zinc 30 ppm | 381 | 36.4 |

As can be noted, the combination of zinc and selenium allows to achieve a significant improvement in terms of reduction in cfu with respect to the use of the two separate components.

EXAMPLE 2

A formulation was prepared which is particularly suitable for the treatment of fabrics. 200 grams of distilled water were added to 1 g of finely ground granulate composed of zinc acetate (0.2 grams), zinc PCA (0.6 grams) and selenium phloroglucinol (0.2 grams), and the mixture was subjected to stirring until the complete dissolution of the agents was obtained. 2 grams of hydroxyapatite were subsequently added. Hydroxyapatite exerts the function of adhesion promoter, as it is believed that selenium and zinc bind to hydroxyapatite which, in turn, adheres to the textile fibers.

Figure 1B:
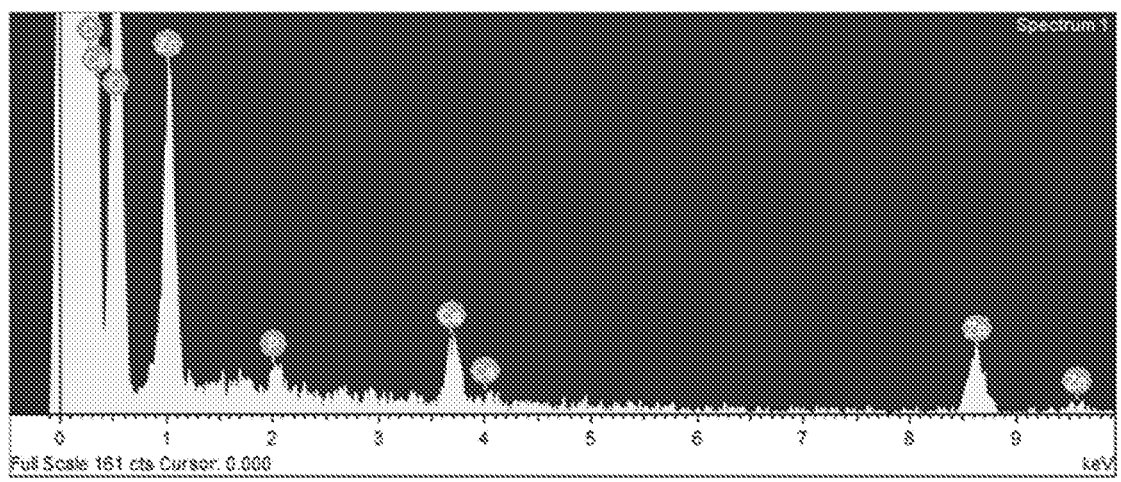

FIGS. 1A and 1B respectively show the SEM (scanning electron microscope) image of the fabric obtained and the EDX elemental analysis image in which the presence of zinc on the surface of the fabric can be observed.

The fabrics thus obtained were subjected to 20 and 40 washing cycles with standard detergent, to evaluate the bacteriostatic effect after mechanical stress.

The bacterial count was measured as an exponential value; the logarithmic value is obtained from this value, which corresponds to an abatement percentage value.

The starting bacterial suspensions were diluted so as to obtain a known bacterial concentration, expressed in colony forming units (cfu/ml). The samples under examination were inoculated with reference microbial strains and placed in an incubator at a temperature of 37±1° C. for 24 hours. At the end of the incubation period, the treated samples and the remaining non-treated samples were adequately washed and the residual microbial charge was then determined in the washing solution.

As can be observed from the data indicated in Table 3, the effectiveness in terms of bacteriostatic effect with respect to the two relevant bacteria in any case remains higher than 99%.

TABLE 3

| MICROBIAL STRAINS | 20 washings | | 40 washings | |
|---|---|---|---|---|
| | Reduct. % | Reduct. log | Reduct. % | Reduct. log |
| *Escherichia Coli* | 99.67 | 2.47 | 99.44 | 2.25 |
| *Staphilococcus Aureus* | 99.89 | 2.95 | 99.43 | 2.25 |

EXAMPLE 3

10 g of rosin were dissolved in 100 g of isopropyl alcohol at a temperature of 25° C. for 12 hours, until the complete dissolution of the resin was obtained. 1 kg of woody material (chipboard) was then introduced into a mixer, an aliquot of the resin dissolved in isopropyl alcohol was then added, and the whole mixture was subjected to stirring for 20 minutes. At the end of the stirring process, a quantity equal to 40 g of finely ground granulate composed of zinc acetate (10 g), zinc PCA (20 g) and selenium phloroglucinol (10 g) was added to the mass of woody chipboard. Finally, the chipboard obtained was subjected to drying treatment in hot air at 40° C. for a total of 20 minutes.

EXAMPLE 4

18 grams of zinc PCA and 10 grams of zinc gluconate were suitably mixed with 10 grams of selenium gluconate and mixed in an alcohol solution (isopropyl alcohol) of polyethyleneglycol (PEG).

The solution with antioxidizing and antibacterial properties was thus added to a quantity of PP polymer (polypropylene) equal to 1 kg. The polypropylene was moulded and the substantial absence of bacterial proliferation was verified on the surface of the article according to the method described above.

The invention claimed is:

1. An article, comprising:
    a material having a surface containing at least one zinc oxide and/or salt, and at least one antioxidant selected from the group consisting of a selenium oxide and/or salt, a flavonoid, and a β-glucan,
    wherein the material is selected from macromolecular, metallic, or mineral material, and
    wherein the article is selected from the group consisting of a textile, a worktop or surface, and an equipment.

2. The article of claim 1, wherein the at least one zinc oxide and/or salt is selected from: zinc oxide, zinc hydroxide, zinc acetate, zinc-PCA (pyrrolidine carboxylic acid zinc salt), zinc chloride, zinc carbonate, zinc sulfate, zinc phosphate and zinc-EDTA (ethylenediaminetetraacetic acid), zinc gluconate, or mixtures thereof.

3. The article of claim 1, wherein an amount of the at least one zinc oxide and/or salt ranges from 0.00001% to 10.0%, and
    wherein the percentages are percentages by weight with respect to a total weight of the material.

4. The article of claim 1, wherein an amount of the at least one antioxidant ranges from 0.00001% to 10.0%, and
    wherein the percentages are percentages by weight with respect to a total weight of the material.

5. The article of claim 1, wherein the at least one antioxidant is selected from the group consisting of selenium oxide, selenium phloroglucinol, selenium chloride, and selenium gluconate.

6. The article of claim 1, wherein the at least one antioxidant is a flavonoid and the flavonoid is anthocyan.

7. The article of claim 1, wherein the at least one antioxidant is a µ-glucan.

8. The article of claim 1, wherein the material comprises: an inorganic adhesion promoter selected from hydroxyapatite, brushite, tricalciumphosphate, amorphous silica, zeolites, clays, montmorillonite, or mixtures thereof.

9. The article of claim 1, wherein the material comprises: an organic adhesion promoter selected from shellac, fishglue, chitins, proteins, lipid proteic derivatives, or albumin.

10. A method of using a mixture comprising at least one zinc oxide and/or salt, and at least one antioxidant selected from the group consisting of a selenium oxide and/or salt, a flavonoid, and a µ-glucan, as a bacteriostatic agent, the method comprising:
    applying the mixture to a surface of a material, wherein the material is selected from macromolecular, metallic, or mineral material,
    wherein the material is configured to be part of an article selected from the group consisting of a textile, a worktop or surface, and an equipment.

11. A process for producing the article of claim 1, wherein the material comprises macromolecular material, the process comprising:
    subjecting the macromolecular material to thermal or chemical treatment to soften the macromolecular material;
    dispersing the at least one zinc oxide and/or salt, and the at least one antioxidant, onto the softened macromolecular material; and using the so-treated macromolecular material to produce the article.

12. A process for producing the article of claim 1, the process comprising:
    dispersing the at least one zinc oxide and/or salt and the at least one antioxidant, in a resin; and treating the material with the resin containing the at least one zinc oxide and/or salt, and the at least one antioxidant to obtain a coating film.

13. The article of claim 1, wherein the material comprises an inorganic adhesion promoter.

14. The article of claim 1, wherein the material comprises an organic adhesion promoter.

15. The article of claim 1, wherein the material comprises hydroxyapatite.

16. The method of claim 10, wherein the article is already formed prior to applying the mixture to the surface of the article.

* * * * *